May 4, 1943.  G. L. DIMMICK  2,318,470
PHOTOELECTRIC MEASURING DEVICE
Filed July 30, 1941
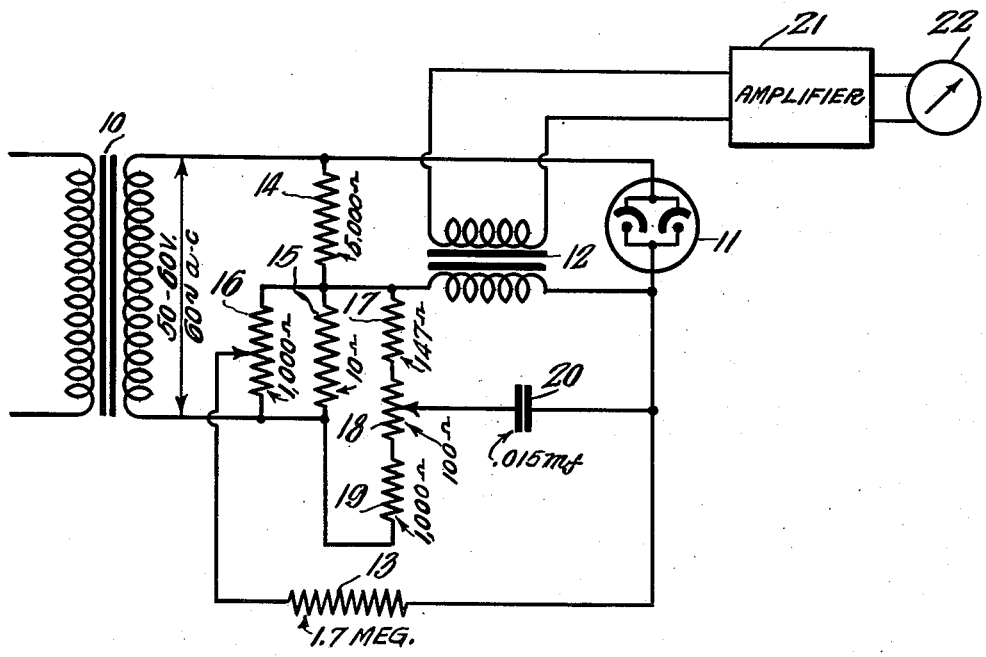
Inventor
Glenn L. Dimmick Patented May 4, 1943

2,318,470

UNITED STATES PATENT OFFICE 2,318,470

PHOTOELECTRIC MEASURING DEVICE

Glenn L. Dimmick, Indianapolis, Ind., assignor to Radio Corporation of America, a corporation of Delaware Application July 30, 1941, Serial No. 404,609

5 Claims. (Cl. 88—23)

This invention relates to an improved photoelectric measuring circuit.

It has heretofore been proposed to use photocells in measuring circuits but the use thereof in a circuit intended to measure to a high degree of precision has been quite difficult due to the extremely high dark resistance of the photocell which rarely reaches infinity and due to the capacitance across the electrodes of the photocell.

In photocell measuring circuits which have heretofore been proposed, those of the direct current type are subject to errors in measuring the average brightness of a fluctuating light source while those of the alternating current type are difficult to correct due to the high resistances and small capacitances which are provided for the proper balancing of the circuit.

In the circuit according to the present invention, I use a compensating circuit in more or less of a bridge arrangement which permits the use of relatively low resistances and relatively large fixed capacitors with potentiometers to adjust the effective values of the elements which it is desired to vary. I use this circuit on alternating current and I am able to secure very precise and stable measurements at light values down to the order of .001 lumen. The accurate measurement of such values is necessary in the measurement of light values in photographic sound recording and it is also necessary in such work that the apparatus have a very considerable range and a minimum of drift.

One object of the invention is to provide an improved photoelectric photometer.

Another object of the invention is to provide a photoelectric light measuring device which will operate on alternating current.

Another object of the invention is to provide a photoelectric photometer which is free from drift.

Another object of the invention is to provide a photocell circuit which can be compensated accurately for photocell capacitance and dark current.

Other and incidental objects of the invention will be apparent to those skilled in the art from a reading of the following specification and an inspection of the accompanying drawing, in which The single figure of drawing is a schematic wiring diagram of my improved circuit.

In the drawing, alternating current is fed to the circuit through the transformer 10. The primary voltage of the transformer is, of course, immaterial but the secondary voltage is preferably, as indicated, 50 to 60 volts and the frequency is preferably 60 cycles. The output from this secondary is applied to the photocell 11 through the circuit illustrated and the output from the photocell is transmitted through the transformer 12 to an appropriate amplifier 21 provided with an appropriate indicating or recording device 22 as shown.

In the circuit illustrated, the output from the transformer is divided across the resistors 14 of 5000 ohms and 15 of 10 ohms, as indicated, the 5,000 ohm resistor being in parallel with the photocell which in turn is in series with the primary of the transformer 12. The values given for these resistors are not fixed but may be chosen in any appropriate ratios according to the type of photocell to be used and the values of resistors and capacitors which may be convenient. In the compensating circuit the photocell is connected through the 1.7 megohm resistor 13 to the movable contact of the 1000 ohm potentiometer 16 which is shunted across the 10 ohm resistor 15. This resistor and potentiometer compensate for the dark current of the photocell 11 and as the contact of the potentiometer 16 is moved toward zero voltage it compensates for a dark current approaching that corresponding to an infinite resistance of the photocell 11. In the circuit shown the ratio of the voltage across the compensating potentiometer 16 to that in the photocell circuit is of the order of 1:1000 and the adjustment to compensate for the dark current to the photocell 11 is correspondingly simple to make.

The adjustment for dark current by the potentiometer 16 does not in any way affect the adjustment for capacitance of the photocell which is made in another portion of the circuit.

To compensate for photocell capacitance the voltage divider 17, 18 and 19 composed of resistors of 147 ohms, 100 ohms and 1000 ohms, respectively, is provided, the 100 ohm resistor being in the form of a potentiometer as shown. The capacitor 20, preferably having a value of .015 mf., is connected from the movable tap of the potentiometer to the anode side of the photocell. These values are appropriate in the circuit shown to compensate for the capacitance of a type 920 photocell. It will be apparent that adjustment of the voltage applied to the capacitor 20 through the potentiometer 18 does not in any way affect the dark current voltage applied through the potentiometer 16 as no appreciable current passes through the capacitor 20 and in addition the capacitor 20 is balanced in what is effectively a bridge circuit against the capacitance of the photocell 11.

It will be understood that the values given in the circuit just described are not fixed but are illustrative of what is at present the preferred form of the invention and are subject to such variations as may be desirable in view of the dark current and capacitance of whatever photocell is to be used and according to the range of light intensities to be measured by the apparatus.

I claim as my invention:

1. A photoelectric photometer including a photocell, a bridge circuit including said photocell and having a ratio of the order of 1000 to 1 of the photocell to a balancing device, and independent capacitance and current balancing means included in said bridge circuit for balancing the capacitance and the dark current of the photocell.

2. A photoelectric photometer including a photocell, a bridge circuit including said photocell and having a ratio of the order of 1000 to 1 of the photocell to a balancing device, and independent adjustable capacitance and current balancing means included in said bridge circuit for independently balancing the capacitance and the dark current of the photocell.

3. A photoelectric light measuring circuit including an input transformer, a voltage dividing resistance connected across the secondary of said transformer, said resistance having a high resistance portion and a low resistance portion, a photocell connected across said high resistance portion in series with an output transformer, said transformer being connected to the junction of the two portions of said resistance, and independent dark current and capacitance balancing means connected across the low resistance portion of said voltage dividing resistance.

4. A photoelectric light measuring circuit including an input transformer, a voltage dividing resistance connected across the secondary of said transformer, said resistance having a high resistance portion and a low resistance portion, a photocell connected across said high resistance portion in series with an output device, said device being connected to the junction of the two portions of said resistance, and independent dark current and capacitance balancing means connected across the low resistance portion of said voltage dividing resistance.

5. A photoelectric light measuring circuit including an input transformer, a voltage dividing resistance connected across the secondary of said transformer, said resistance having a high resistance portion and a low resistance portion, a photocell connected across said high resistance portion in series with an output transformer, said transformer being connected to the junction of the two portions of said resistance, and independently adjustable dark current and capacitance balancing means connected across the low resistance portion of said voltage dividing resistance.

GLENN L. DIMMICK.